United States Patent
Ahmad

(10) Patent No.: US 8,996,674 B2
(45) Date of Patent: Mar. 31, 2015

(54) SYSTEM, METHOD AND COMPUTER PROGRAM PRODUCT FOR SNMP BASED MOBILE DEVICE MANAGEMENT

(75) Inventor: Mohammad Ahmad, Mercer Island, WA (US)

(73) Assignee: salesforce.com, inc., San Francisco, CA (US)

( * ) Notice: Subject to any disclaimer, the term of this patent is extended or adjusted under 35 U.S.C. 154(b) by 223 days.

(21) Appl. No.: 13/592,245

(22) Filed: Aug. 22, 2012

(65) Prior Publication Data

US 2013/0246594 A1 Sep. 19, 2013

Related U.S. Application Data

(60) Provisional application No. 61/612,455, filed on Mar. 19, 2012.

(51) Int. Cl.
*G06F 15/173* (2006.01)
*H04L 12/24* (2006.01)

(52) U.S. Cl.
CPC ........... *H04L 41/0213* (2013.01); *H04L 41/046* (2013.01)
USPC ............ 709/223; 709/224; 709/225; 709/204

(58) Field of Classification Search
CPC ... G06F 3/0604; G06F 3/0605; G06F 3/0629; G06F 3/067; G06F 11/0709; G06F 11/0748; H04L 41/0213; H04L 41/0631
USPC .......................................... 709/223–225, 204
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,046,980 A * | 4/2000 | Packer .......................... | 370/230 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |

(Continued)

*Primary Examiner* — Wing F Chan
*Assistant Examiner* — Benjamin M Thieu
(74) *Attorney, Agent, or Firm* — Zilka-Kotab, PC

(57) ABSTRACT

In accordance with embodiments, there are provided mechanisms and methods for SNMP based mobile device management. These mechanisms and methods for SNMP based mobile device management can enable embodiments to provide a unified and platform-independent MDM solution having the automated identification and handling of various network and/or mobile device conditions. The ability of embodiments to provide MDM in a platform-independent and automated manner can enable the delivery of reliable, error-free services to mobile device users.

20 Claims, 6 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,404,743 B1 * | 6/2002 | Meandzija ............ 370/254 |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 7,966,392 B2 * | 6/2011 | Keeni ............ 709/223 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,604,910 B2 * | 12/2013 | Howarth ............ 340/10.1 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148485 A1 * | 7/2004 | Suzuki ............ 711/170 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0070495 A1 * | 3/2008 | Stricklen et al. ............ 455/3.01 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

SYSTEM, METHOD AND COMPUTER PROGRAM PRODUCT FOR SNMP BASED MOBILE DEVICE MANAGEMENT

CLAIM OF PRIORITY

This application claims the benefit of U.S. Provisional Patent Application 61/612,455 entitled "System and Method for Mobile Device Management," by Mohammad Ahmad, filed Mar. 19, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to mobile device management.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the continuous and rapidly evolving area of mobile development, more and more interest is being focused on mobile device management (MDM). MDM may include processes for securing, monitoring, managing, and supporting mobile devices deployed across mobile operators, service providers, and enterprises. However, traditional techniques for providing MDM have exhibited various limitations.

For example, existing MDM solutions require human intervention by requiring that technical assistance engineers or network administrators monitor the network and identify service-affecting conditions and take actions to correct them. In particular, MDM is sometimes performed by users testing and simulating the action of thousands of mobile devices, for manually detecting and correcting errors associated with the mobile devices. However, the requirement of manual intervention results in delays in identifying and responding to undesired conditions affecting the mobile device.

As another example, existing MDM solutions do not provide a unified system, or a universal solution, for fault and performance mobile management. Specifically, existing MDM solutions typically only support a subset of all mobile platforms.

Accordingly, it is desirable to provide techniques enabling a unified and platform-independent MDM solution capable of providing the automated identification and handling of various network and/or mobile device conditions, to improve the delivery of reliable, error-free services to mobile device users.

BRIEF SUMMARY

In accordance with embodiments, there are provided mechanisms and methods for SNMP based mobile device management. These mechanisms and methods for SNMP based mobile device management can enable embodiments to provide a unified and platform-independent MDM solution having the automated identification and handling of various network and/or mobile device conditions. The ability of embodiments to provide mobile device management in a platform-independent and automated manner can enable the delivery of reliable, error-free services to mobile device users.

In an embodiment and by way of example, a method for SNMP based mobile device management is provided. In use, a SNMP notification of a status of an aspect of a mobile device is received from the mobile device. Additionally, at least one rule is applied to the status of the aspect of the mobile device. Furthermore, an action is automatically performed, based on a result of the application of the rule to the status of the aspect of the mobile device.

While one or more implementations and techniques are described with reference to an embodiment in which SNMP based mobile device management is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for SNMP based mobile device management.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing SNMP based mobile device management will be described with reference to example embodiments.

Figure 1:
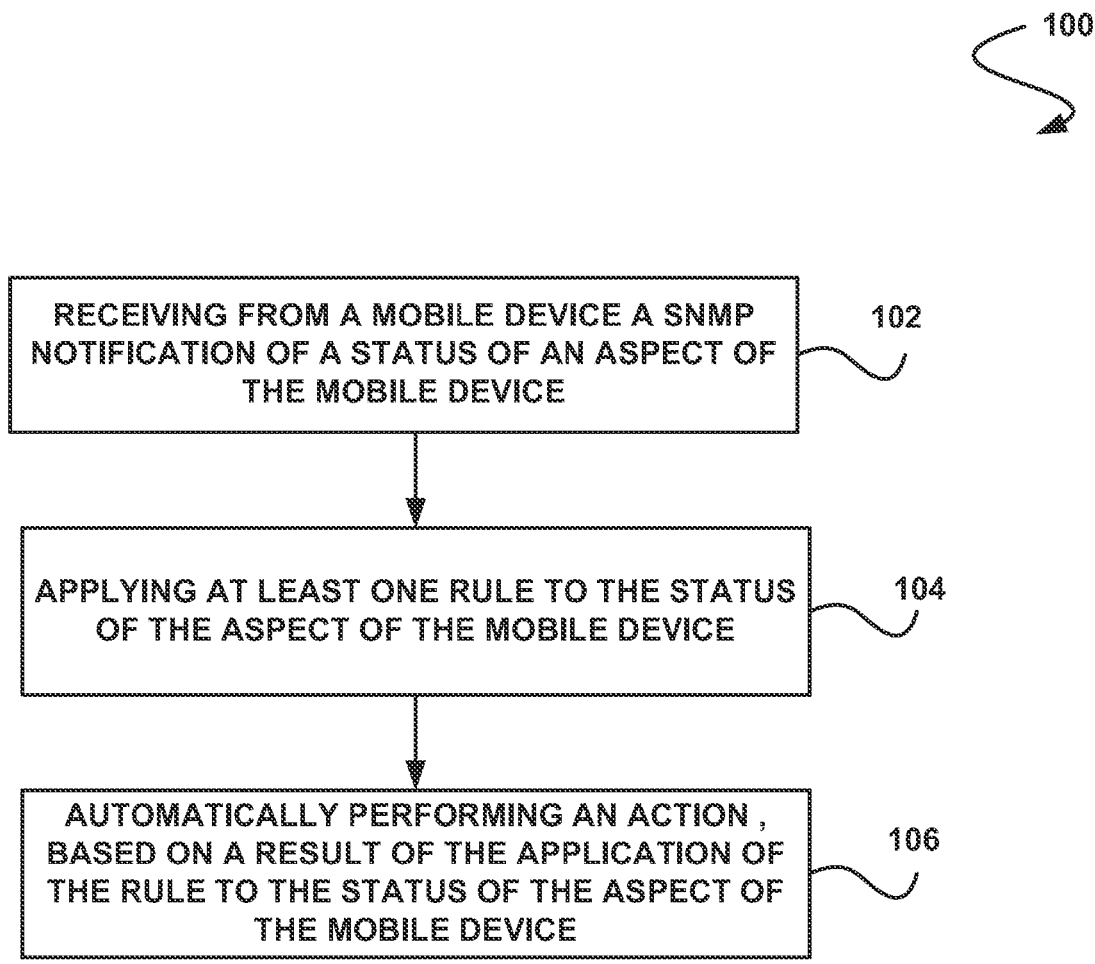
FIG. 1 illustrates a method for SNMP based mobile device management in accordance with an embodiment.

FIG. 1 illustrates a method 100 for SNMP based mobile device management in accordance with an embodiment. As shown in operation 102, a Simple Network Management Protocol (SNMP) notification of a status of an aspect of a mobile device is received from the mobile device. In the context of the present description, the mobile device may include any device that is capable of wireless communications via a mobile network. For example, the mobile device may be a laptop, smartphone, etc. Accordingly, the SNMP notification may be received over a mobile network with which the mobile device is connected.

Also with respect to the present description, the mobile device is equipped with SNMP service functionality, for allowing the mobile device to send the SNMP notification. For example, an SNMP agent may be installed on the mobile device for generating SNMP notifications. In this way, the SNMP notification may be received from an SNMP agent installed on the mobile device.

As noted above, the SNMP notification received from the mobile device is of a status of an aspect of the mobile device. The aspect of the mobile device may be hardware of the mobile device, software of the mobile device, data stored on the mobile device, etc. In addition, the status of the aspect of the mobile device may relate to any current state of the aspect of the mobile device, such as an operational status of hardware of the mobile device, settings for the hardware of the mobile device, a functional status of the software of the mobile device, etc.

Just by way of example, the aspect of the mobile device may be a battery of the mobile device and the status may be a remaining level of charge of the battery of the mobile device. As another example, the aspect of the mobile device may be a display screen of the mobile device and the status may be a brightness level of the display screen of the mobile device. As yet another embodiment, the aspect of the mobile device may be a network communications application of the mobile device (e.g. email application, web application, etc.), and the status may be an ability, speed, etc. in transmitting/receiving network communications.

It should be noted that the SNMP notification may indicate the status of the aspect of the mobile device in any desired manner. In one embodiment, the SNMP notification may include an identifier of the aspect of the mobile device and a value indicating the status of the aspect of the mobile device. Just by way of example, the SNMP notification may be a SNMP trap.

Further, the SNMP notification may be received from the mobile device in response to a change in the status of the aspect of the mobile device. In the example above where the SNMP notification is a SNMP trap, the notification may be automatically generated and sent by the mobile device when the change in the status of the aspect of the mobile device is detected. According, the SNMP notification may be event-based, by being sent in response to an event occurring on the mobile device that is related to the aspect of the mobile device (e.g. the change to the status of the aspect of the mobile device).

Accordingly, the aspect of the mobile device may be monitored (e.g. by the SNMP agent). Such monitoring may optionally be in accordance with the aspect of the mobile device being one of a plurality of mobile device aspects listed in a library, where the library indicates which mobile device aspects are to be monitored for changes in status or other related events. In this way, periodic polling the mobile device for the status of the aspect of the mobile device may be avoided, and the SNMP notification of the status of the aspect of the mobile device may be received in real-time with respect to the change of such status occurring.

Additionally, as shown in operation 104, at least one rule is applied to the status of the aspect of the mobile device. Optionally, the rule may be predefined for the aspect of the mobile device. Thus, each rule that is predefined for the aspect of the mobile device may be applied to the status of the aspect of the mobile device indicated by the received SNMP notification. It should be noted that different aspects of the mobile device may be associated with (e.g. mapped to, etc.) different predefined rules, In one embodiment, the rule may evaluate the status of the aspect of the mobile device with respect to predetermined criteria (e.g. a threshold, predefined value, etc.). For example, the evaluation may include comparing the status of the aspect of the mobile device to the predetermined criteria. As another example, the evaluation may be a function of the status of the aspect of the mobile device.

Of course, however the rule may be applied to the status of the aspect of the mobile device in any manner that outputs a result, the reasons for which will be described in more detail below. For example, evaluation of the status of the aspect of the mobile device with respect to predetermined criteria may output a result. The result may be any value, depending on a type of the rule, such as a Boolean value (i.e. true or false), a numeric value, etc.

Furthermore, as shown in operation 106, an action is automatically performed, based on a result of the application of the rule to the status of the aspect of the mobile device. In one embodiment, the automatic performance of the action may be conditioned on a value of the result of the application of the rule to the status of the aspect of the mobile device. Thus, the action may not necessarily be automatically performed, depending on the result of the application of the rule to the status of the aspect of the mobile device.

In another embodiment, the particular action that is automatically performed may be based on the result of the application of the rule to the status of the aspect of the mobile device. With respect to such embodiment, different results of the application of the rule to the status of the aspect of the mobile device may be predetermined to be associated with different actions. Just by way of example, a result that is "true" may result in one action being automatically performed, whereas a result that is "false" may result in another action being automatically performed. To this end, the action may be predefined for the particular rule applied to the status of the aspect of the mobile device.

In one exemplary embodiment, the action may include instructing the mobile device to perform an operation related to the aspect of the mobile device. With respect to such exemplary embodiment, the particular operation that the mobile device is instructed to perform may depend on the result of the application of the rule to the status of the aspect of the mobile device. In another exemplary embodiment, the action may include instructing a third party entity to perform an operation. Of course, the action may also include simply automatically performing the operation without necessarily further communicating with the mobile device and/or the third party device.

Optionally, the action may be used for remedying an error, problem, reduced quality, etc. associated with the aspect of the mobile device. For example, the rule may be utilized to identify a cause of the status of the aspect of the mobile device. Moreover, the action may be automatically performed, based on the result of the application of the rule to the status of the aspect of the mobile device, for responding to (e.g. remedying, etc.) the cause of the status of the aspect of the mobile device.

Just by way of example where the aspect of the mobile device is a battery of the mobile device and the status is a remaining level of charge of the battery of the mobile device, the rule applied to the status of the aspect of the mobile device may indicate that when the remaining level of charge of the battery is below a predefined amount, an action is to be automatically taken to instruct the mobile device to lower a brightness of the display device of the mobile device, terminate applications on the mobile device, or some other preconfigured operation reducing consumption of the charge of the battery. Thus, an automatic response to the level of charge of the battery being below the predefined amount may be taken by the mobile device, without necessarily requiring human intervention.

As another example where the aspect of the mobile device is a network communications application of the mobile device (e.g. email application, web application, etc.), and the status is an ability, speed, etc. in transmitting/receiving network communications, the rule applied to the status of the aspect of the mobile device may indicate that when a speed of transmitting/receiving network communications by the communications application is below a predetermined threshold, an action is to be automatically taken to instruct the mobile device to connect to a different network for sending/receiving network communications via the communications application. Thus, the rule may be used to identify whether the status of the aspect of the mobile device indicates a reduced quality of service in sending/receiving network communications, and an appropriate action may be automatically taken in response to a result of the application of the rule to the status of the aspect of the mobile device.

By automatically performing an action, based on a result of applying a rule to a status of an aspect of a mobile device received from the mobile device via an SNMP notification, manual intervention in responding to the SNMP notification may be avoided. This may further allow such response to be taken in real-time, for allowing real-time handling of events occurring on the mobile device. Thus, where the application of the rule to the status of an aspect of a mobile device results in an indication of a particular network and/or mobile device condition, an automated response for handling such condition may be provided. This may in turn allow for the delivery of more reliable, error-free network and/or other services to the mobile device.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
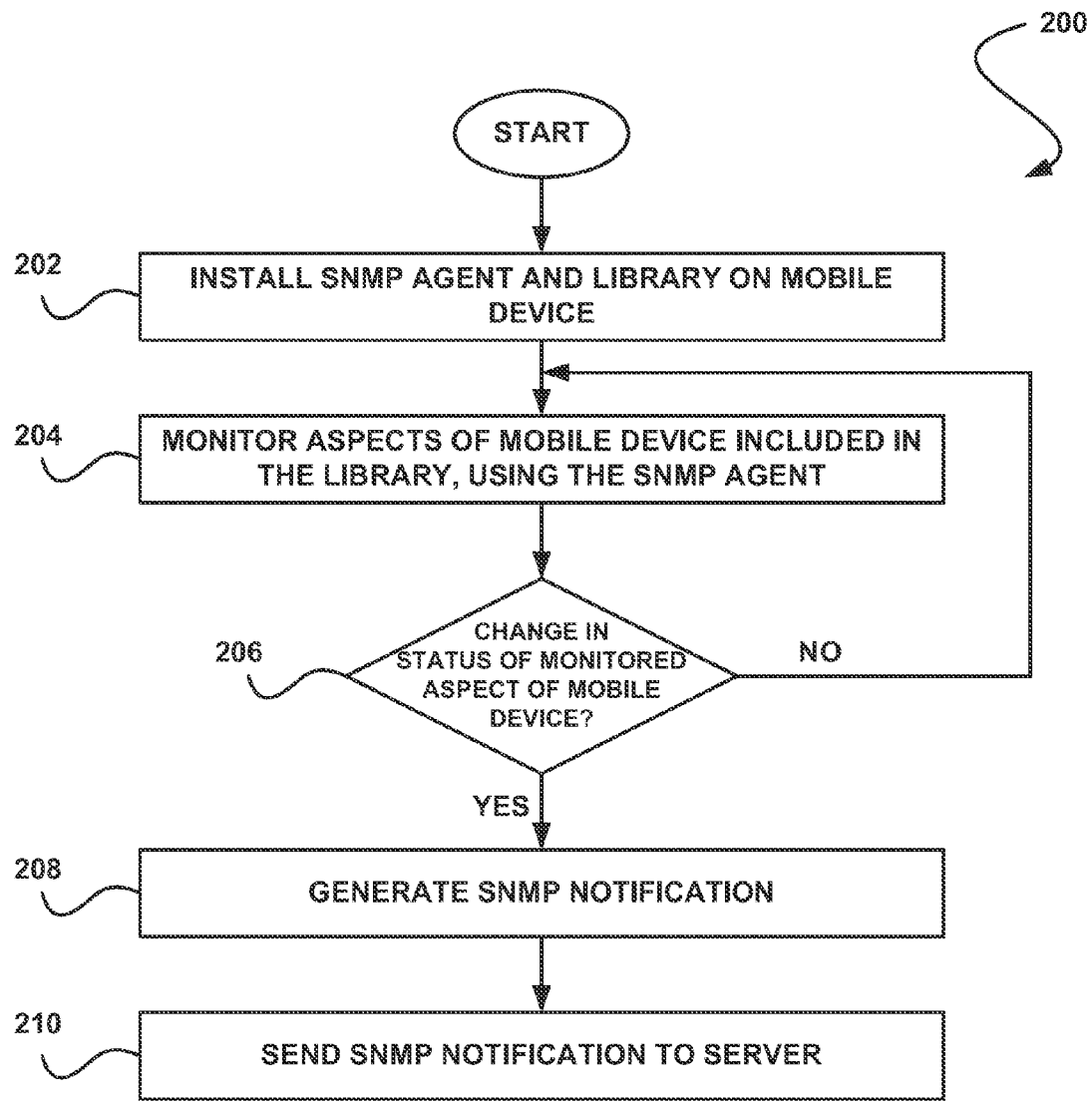
FIG. 2 illustrates a method for communicating SNMP notifications by a mobile device in accordance with an embodiment.

FIG. 2 illustrates a method 200 for communicating SNMP notifications by a mobile device in accordance with an embodiment. As an option, the method 200 may be carried out in the context of the method 100 of FIG. 1. For example, the method 200 may be carried out by a mobile device. Of course, however, the method 200 may be carried out in any desired environment. It should also be noted that the aforementioned definitions may apply during the present description.

As shown in operation 202, an SNMP agent and a library are installed on a mobile device. The SNMP agent and the library may be packaged together in one embodiment, or may optionally be separate in another embodiment. Moreover, the SNMP agent and the library may be installed from a server via a mobile network with which the mobile device and the server are connected.

The SNMP agent may include logic (e.g. code) for monitoring aspects of the mobile device. Such aspects may be preselected and listed in the library. Thus, the SNMP agent may optionally only monitor aspects of the mobile device that are listed in the library.

In one embodiment, the SNMP agent and the library may be platform-independent. For example, the SNMP agent and the library may be capable of being used by any desired mobile device platform. As an option, the library may not necessarily be specific to aspects of a particular mobile device platform, but may list aspects of multiple different mobile device platforms. In addition, the SNMP agent may include logic for only monitoring mobile device aspects listed in the library that are specific to the mobile device on which the SNMP agent is installed.

Additionally, as shown in operation 204, aspects of the mobile device included in the library are monitored, using the SNMP agent. In one embodiment, the aspects of the mobile device that are listed in the library may be monitored for changes in a status of the aspects of the mobile device. Of course, in another embodiment, the aspects of the mobile device may be monitored for any events occurring in association therewith.

It is then determined in decision 206 whether a change in a status of a monitored aspect of the mobile device has occurred. As noted above, such change may be identified using the SNMP agent installed on the mobile device. If it is determined that a change in a status of a monitored aspect of the mobile device has not occurred, the method 200 continues to monitor aspects of the mobile device included in the library (operation 204).

Once it is determined that a change in a status of a monitored aspect of the mobile device has occurred, an SNMP notification is generated. Note operation 208. The SNMP notification may be a SNMP trap, for example. Accordingly, the notification may include a unique identifier of the aspect of the mobile device (e.g. as listed in the library) and a value indicating the status of such aspect of the mobile device.

The SNMP notification is then sent to a server, as shown in operation 210. As an option, the SNMP notification may be sent to the server in real-time with respect to the determination that the change in a status of the monitored aspect of the mobile device has occurred. In this way, intentional delay in reporting the status change to the server may be avoided.

Figure 3:
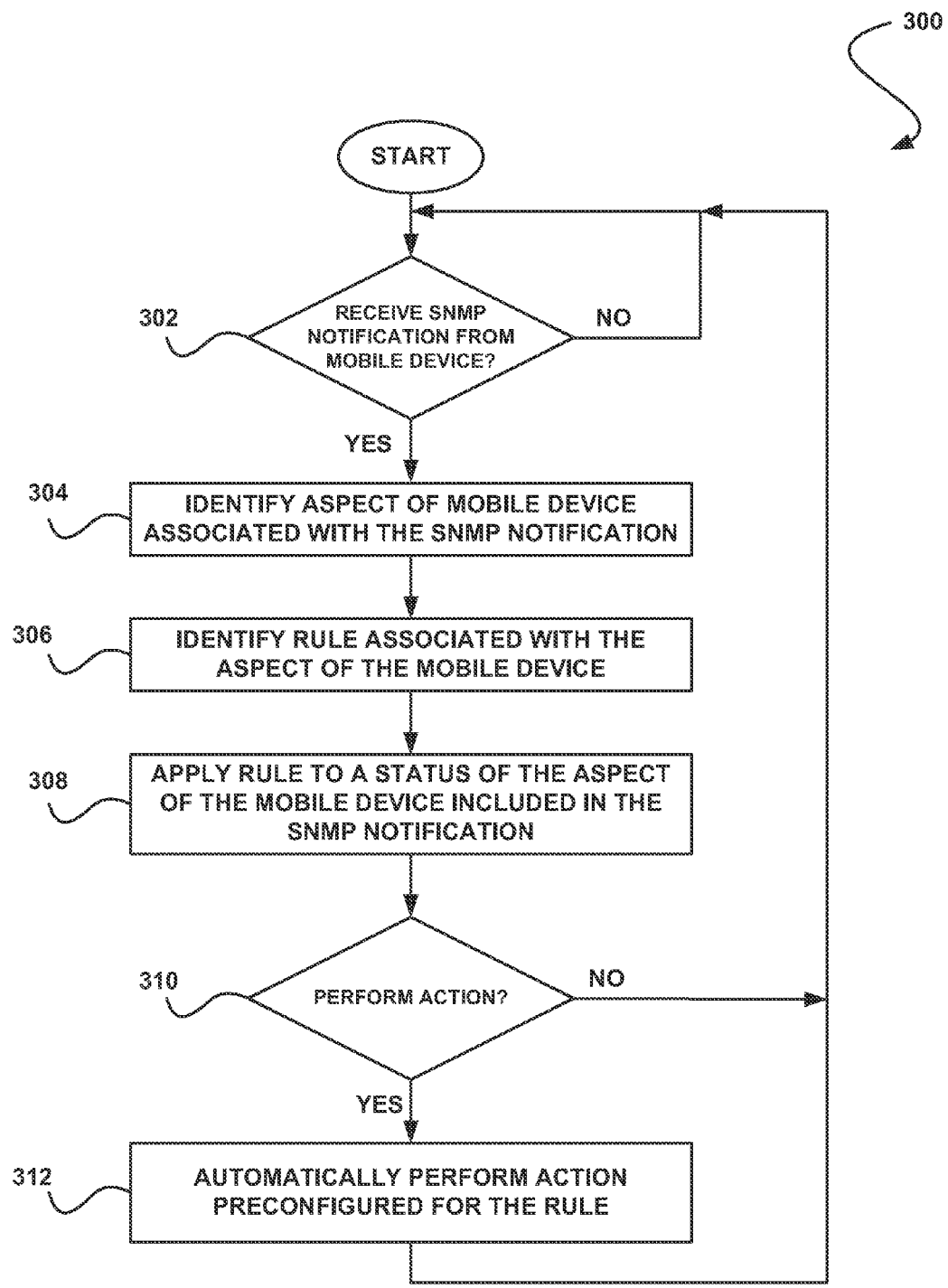
FIG. 3 illustrates a method for handling SNMP notifications received by a server, in accordance with an embodiment.

FIG. 3 illustrates a method 300 for handling SNMP notifications received by a server, in accordance with an embodiment. As an option, the method 300 may be carried out in the context of FIGS. 1-2. For example, the method 300 may be carried out by the server. Of course, however, the method 300 may be carried out in any desired environment. Again, it should be noted that the aforementioned definitions may apply during the present description.

As shown in decision 302, it is initially determined whether an SNMP notification has been received from a mobile device. If it is determined that an SNMP notification has not been received from a mobile device, the method 300 continues to wait for such an SNMP notification to be received. Once it is determined that an SNMP notification has been received from a mobile device, an aspect of the mobile device associated with the SNMP notification is identified. Note operation 304. For example, the aspect of the mobile device maybe identified directly from the SNMP notification (i.e. where the SNMP notification includes the unique identifier of the aspect of the mobile device, as described above with respect to operation 208 of FIG. 2).

A rule associated with the aspect of the mobile device is then identified, as shown in operation 306. The rule may be a rule that is predefined for the aspect of the mobile device, and may be identified via a mapping of the aspect of the mobile device to the rule. Furthermore, as shown in operation 308, the rule is applied to a status of the aspect of the mobile device included in the SNMP notification.

Accordingly, the status of the aspect of the mobile device may be identified directly from the SNMP notification (i.e. where the SNMP notification includes the status of the aspect of the mobile device, as described above with respect to operation 208 of FIG. 2). In the present embodiment, the rule may indicate whether or not an action is to be taken based on the status of the aspect of the mobile device. For example, the rule may be used to evaluate the status of the aspect of the mobile device to determine indicate whether or not an action is to be taken. Just by way of example, if the application of the rule to the status indicates a potentially undesired condition (e.g. of a network or the mobile device), the rule may indicate that a particular action is to be taken.

Thus, it is determined in decision 310 whether an action is to be performed, based on the application of the rule to the status of the aspect of the mobile device. If it is determined that an action is not to be performed, the method 300 does not take any action with respect to the received SNMP notification, and the method 300 further waits for such another SNMP notification to be received (operation 302). However, if it is determined that an action is to be performed, an action preconfigured for the rule is automatically performed, as shown in operation 312. For example, the action may be preconfigured to respond to, alleviate, remedy, etc. the potentially undesired condition indicated as a result of the application of the rule to the status of the aspect of the mobile device.

As an option, prior to or in addition to) applying the rule to the status of the aspect of the mobile device included in the received SNMP notification, the received SNMP notification may be correlated with at least one other SNMP notification previously received from one or more other mobile devices. Such correlation may be made in response to a determination that the SNMP notifications relate to the same mobile device aspect and indicate the same or similar statuses for such mobile device aspect (e.g. the status of the aspect of one mobile device is at least within a predetermined range of the status of the aspect of the other mobile device). Further, the correlation may be performed based on any matching attribute of the mobile devices. Just by way of example, where SNMP notifications are received indicating that a network communication application of the mobile devices have a status indicating a reduced network communication speed, such SNMP notifications may be correlated based on a determination that the mobile devices from which the SNMP notifications are received are connected to a same network (e.g. as determined by an Internet Protocol OP) address of the mobile devices).

Once the SNMP notifications are correlated, a rule may be applied to the correlated SNMP notifications to determine whether (or which) automatic action is to be performed. In the example above where the SNMP notifications relate to reduced network communications speeds, the rule may indicate that to correct such reduced network communications speeds them mobile devices are to connect to a different network for sending/receiving network communications. Thus, such a result of the application of the rule to the statuses included in the correlated network communications may prompt an instruction to connect to another network to be automatically sent to the mobile devices.

Figure 4:
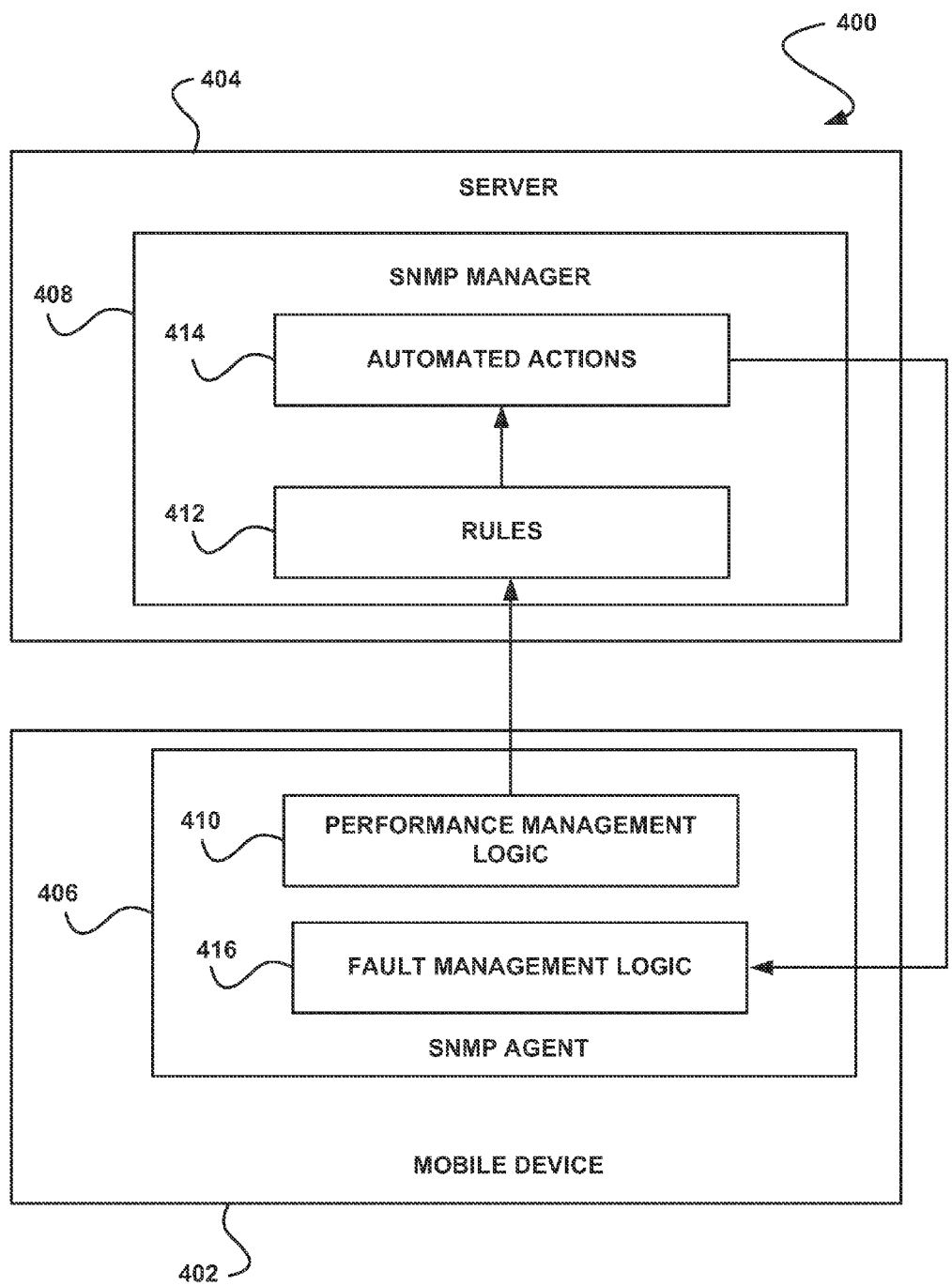
FIG. 4 illustrates a system for SNMP based mobile device management, in accordance with an embodiment.

FIG. 4 illustrates a system 400 for SNMP based mobile device management, in accordance with an embodiment. As an option, the system 400 may be implemented to in the context of FIGS. 1-3. Of course, however, the system 400 may be implemented in any desired environment. It should also be noted that the aforementioned definitions may apply during the present description.

As shown, a mobile device 402 is connected to a server 404. Such a connection is made via a mobile (i.e. wireless) network. While only one mobile device 402 is shown, it should be noted that the server 404 may be connected to any number of different mobile devices, which may or may not be of a same platform (e.g. operation system, etc.).

The mobile device 402 has installed thereon a SNMP agent 406 which communicates with an SNMP manager 408 installed on the server 404. The SNMP manager 408 installed on the server 404 may be a component of, or otherwise be driven by, a mobile monitoring and support system (MMSS) (not shown). By including the SNMP agent 406 on the mobile device 402 and any other mobile devices, SNMP may be enabled on the mobile device 402 and such other mobile devices for providing a common and universal approach for the MMSS of the sever 404 to monitor the mobile network devices which may be of different platforms.

The SNMP agent 406 of the mobile device 402 defines a standard infrastructure and/or interface to interact with the SNMP manager 408 of the server 404. In particular, the SNMP agent 406 of the mobile device 402 includes performance management logic 410 for monitoring aspects of the mobile device 402 and further for generating SNMP notifications (e.g. SNMP traps) containing fault and performance data related to the monitored aspects of the mobile device 402. The fault and performance data may be included by indicating in each SNMP notification the aspect of the mobile device 402 with which the SNMP notification relates, along with a status of such aspect of the mobile device 402.

The SNMP notifications will be automatically sent from the performance management logic 410 of the SNMP agent 406 to a rules engine 412 of the SNMP manager 408 of the server 404. Thus, the SNMP manager 408 of the server 404 will collect a sequence of SNMP notifications indicated events of mobile devices that may or may not be related. As an option, the SNMP notifications may be correlated based on the relationships therebetween, The rules engine 412 will apply appropriate rules to the status of the aspect of the mobile device 402 identified by the SNMP notification (or the correlated SNMP notifications) to identify a root cause behind the generation of the SNMP notification. The result of the application of the rule to the status of the aspect of the mobile device 402 identified by the SNMP notification is then forwarded to an automated actions engine 414 of the SNMP manager 408 of the server 404.

The automated actions engine 414 can then automatically perform an action associated with such result received from the rules engine 412. In the embodiment shown, the action may include sending instructions to fault management logic 416 of the SNMP agent 406 of the mobile device 402. The instructions may be to perform a particular operation to remedy the root cause behind the generation of the SNMP notification, or to otherwise work around the root cause behind the generation of the SNMP notification. For example, the operation may optionally change the configuration or service settings of the mobile device 402. Thus, the action may used for repairing a problem in the mobile device 402 or in an underlying service used by the mobile device 402. As a further option, the SNMP manager 408 of the server 404 may log the received SNMP notifications for review by an operator of the server 402, for any desired purpose.

System Overview

Figure 5:
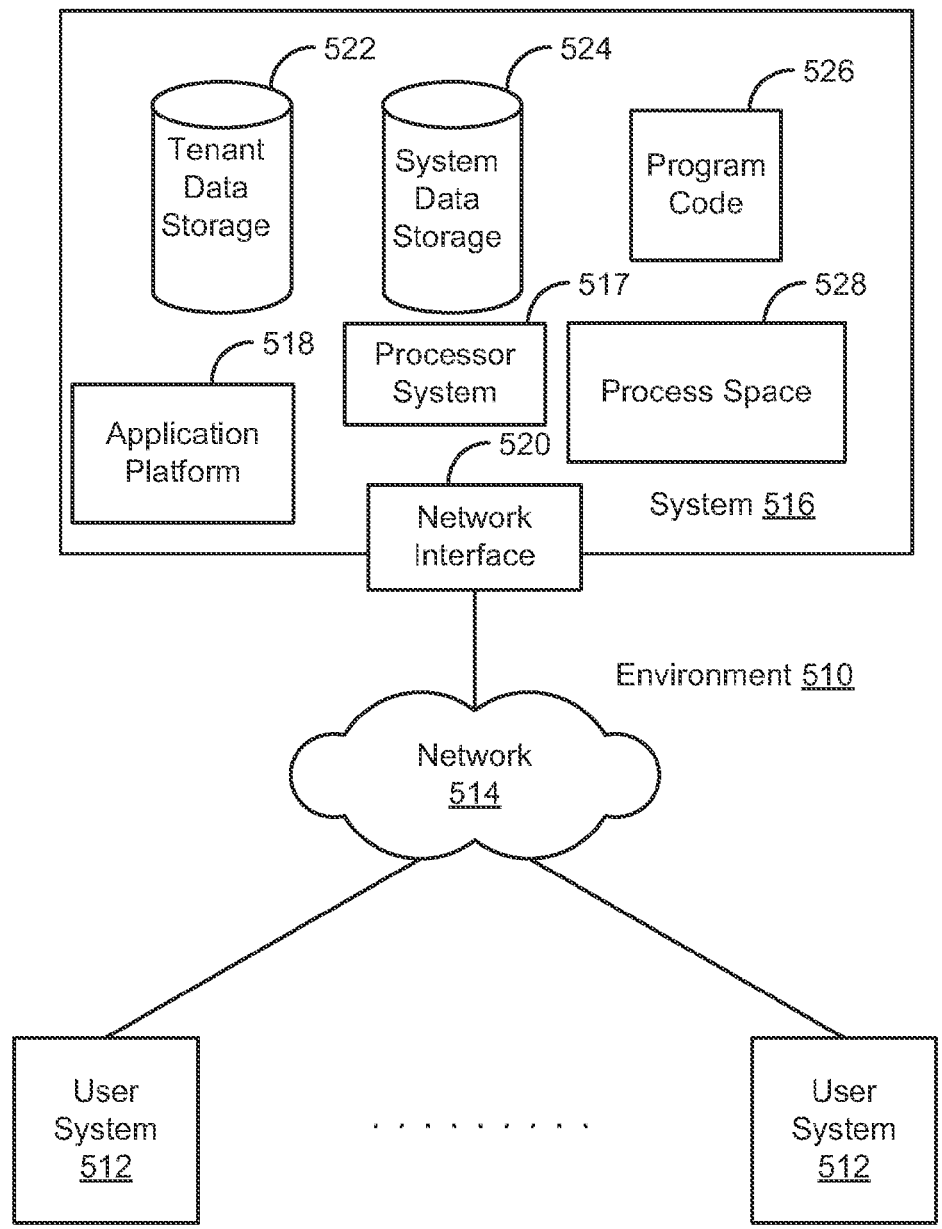
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with budding and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP. etc. In an example where HTTP is used, user system 512 might include an HTTP client commonly referred to as a "browser" for sending and receiving HTTP messages to and from an HTTP) server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
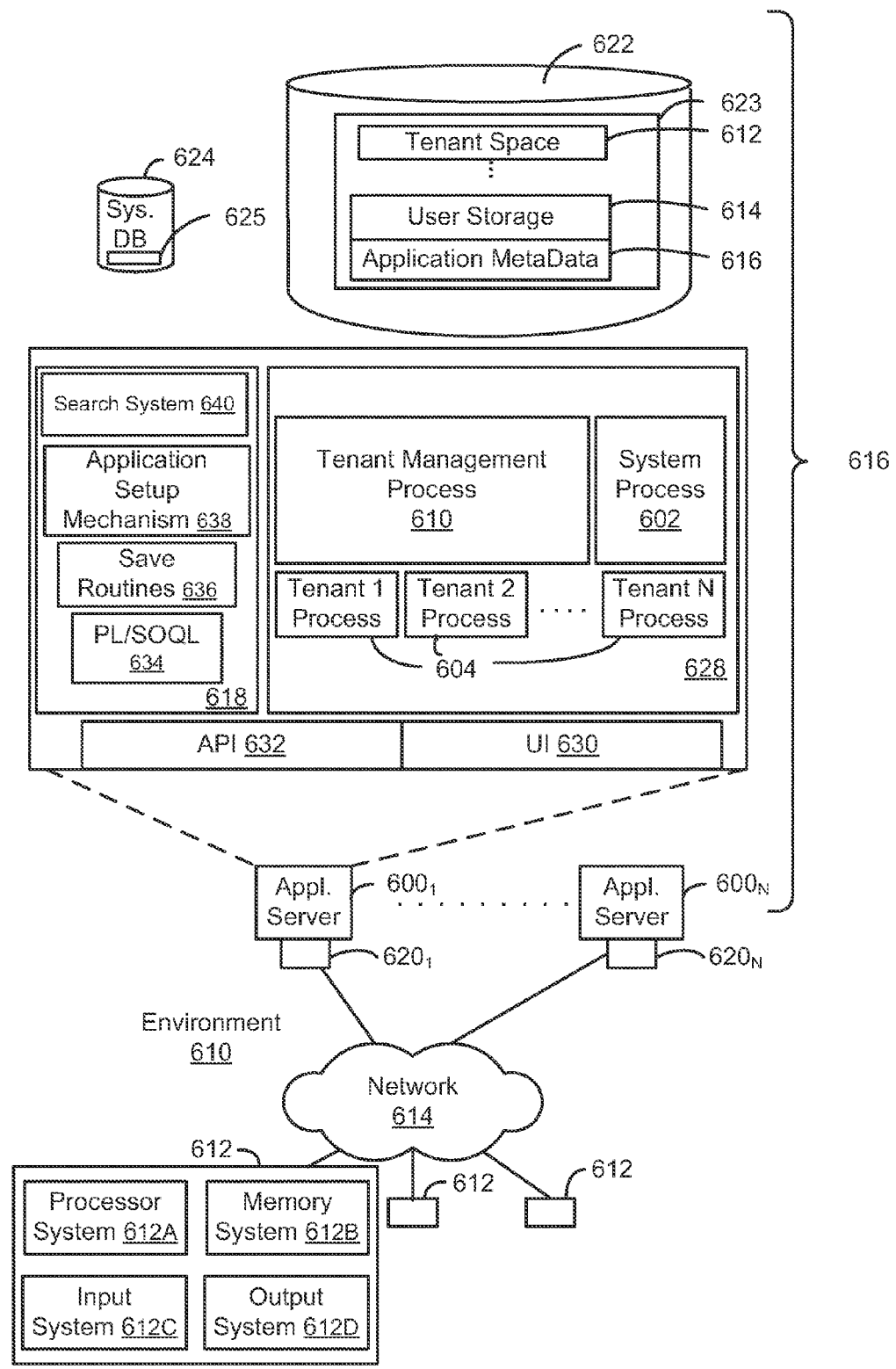
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 61.6. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method, the method comprising:
receiving, by a server, from a first mobile device a first Simple Network Management Protocol (SNMP) notification of a status of an aspect of the first mobile device;
correlating the first SNMP notification with a second SNMP notification previously received by the server from a second mobile device, the second SNMP notification comprising a status of an aspect of the second mobile device, wherein the correlating is performed in response to:
determining that the first SNMP notification and the second SNMP notification relate to a same aspect, and
determining that the status of the aspect of the second mobile device is at least within a predetermined range of the status of the aspect of the first mobile device;
applying at least one rule to the correlated first and second SNMP notifications to identify a cause of the status of the aspect of the first and second mobile devices; and
automatically performing an action, based on a result of applying the at least one rule to the correlated first and second SNMP notifications for responding to the cause of the status of the aspect of the first and second mobile devices.

2. The computer program product of claim 1, wherein the first SNMP notification is received over a mobile network with which the first mobile device is connected.

3. The computer program product of claim 1, wherein the first SNMP notification is received from an SNMP agent installed on the first mobile device.

4. The computer program product of claim 1, wherein the first SNMP notification includes an identifier of the aspect of the first mobile device and a value indicating the status of the aspect of the first mobile device.

5. The computer program product of claim 1, wherein the first aspect of the first mobile device is one of a plurality of mobile device aspects listed in a library.

6. The computer program product of claim 1, wherein the first SNMP notification is received in response to a change in the status of the aspect of the first mobile device.

7. The computer program product of claim 1, wherein the aspect of each of the first and second mobile devices is hardware of the respective first and second mobile devices.

8. The computer program product of claim 7, wherein the status of the hardware of the first and second mobile devices is an operational status of the hardware of the respective first and second mobile devices.

9. The computer program product of claim 7, wherein the status of the hardware of the first and second mobile devices is settings for the hardware of the respective first and second mobile devices.

10. The computer program product of claim 1, wherein the aspect of the first and second mobile devices is software of the respective first and second mobile devices.

11. The computer program product of claim 10, wherein the status of the software of the first and second mobile devices is a functional status of the software of the respective first and second mobile devices.

12. The computer program product of claim 1, wherein the at least one rule is predefined for the aspect of the first and second mobile devices.

13. The computer program product of claim 1, wherein the at least one rule evaluates the status of the aspect of the first and second mobile devices with respect to predetermined criteria.

14. The computer program product of claim 1, wherein the automatic performance of the action is conditioned on a value of the result of applying the rule to the status of the aspect of the first and second mobile devices.

15. The computer program product of claim 1, wherein the action is predefined for the rule.

16. The computer program product of claim 1, wherein the action includes instructing the first and second mobile devices to perform an operation related to the aspect of the respective first and second mobile devices.

17. The computer program product of claim 1, wherein the correlating is performed in response to matching an attribute of the first mobile device and an attribute of the second mobile device.

18. A method, comprising:
receiving, by a server, from a first mobile device a first Simple Network Management Protocol (SNMP) notification of a status of an aspect of the first mobile device;
correlating the first SNMP notification with a second SNMP notification previously received by the server from a second mobile device, the second SNMP notification comprising a status of an aspect of the second mobile device, wherein the correlating is performed in response to:
determining that the first SNMP notification and the second SNMP notification relate to a same aspect, and
determining that the status of the aspect of the second mobile device is at least within a predetermined range of the status of the aspect of the first mobile device;

applying at least one rule to the correlated first and second SNMP notifications, utilizing a processor, to identify a cause of the status of the aspect of the first and second mobile devices; and automatically performing an action, based on a result of applying the at least one rule to the correlated first and second SNMP notifications for responding to the cause of the status of the aspect of the first and second mobile devices.

19. An apparatus, comprising: a processor for:

receiving, by a server, from a first mobile device a first Simple Network Management Protocol (SNMP) notification of a status of an aspect of the first mobile device;

correlating the first SNMP notification with a second SNMP notification previously received by the server from a second mobile device, the second SNMP notification comprising a status of an aspect of the second mobile device, wherein the correlating is performed in response to:

determining that the first SNMP notification and the second SNMP notification relate to a same aspect, and determining that the status of the aspect of the second mobile device is at least within a predetermined range of the status of the aspect of the first mobile device;

applying at least one rule to the correlated first and second SNMP notifications to identify a cause of the status of the aspect of the first and second mobile devices; and automatically performing an action, based on a result of applying the at least one rule to the correlated first and second SNMP notifications for responding to the cause of the status of the aspect of the first and second mobile devices.

20. A method for transmitting code, comprising: transmitting code for receiving, by a server, from a first mobile device a first Simple Network Management Protocol (SNMP) notification of a status of an aspect of the first mobile device;

transmitting code for correlating the first SNMP notification with a second SNMP notification previously received by the server from a second mobile device, the second SNMP notification comprising a status of an aspect of the second mobile device, wherein the correlating is performed in response to:

determining that the first SNMP notification and the second SNMP notification relate to a same aspect, and determining that the status of the aspect of the second mobile device is at least within a predetermined range of the status of the aspect of the first mobile device;

transmitting code for applying at least one rule to the correlated first and second SNMP notifications to identify a cause of the status of the aspect of the first and second mobile devices; and transmitting code for automatically performing an action, based on a result of applying the at least one rule to the correlated first and second SNMP notifications for responding to the cause of the status of the aspect of the first and second mobile devices.

* * * * *